2 Sheets—Sheet 1.

S. S. HITCHCOCK.
Platform-Balance.

No. 216,957. Patented July 1, 1879.

Witnesses:
J. P. Th. Lang.
C. A. Dibble

Inventor:
Silvester S. Hitchcock
by
Mann, Benedict & Lamm

2 Sheets—Sheet 2.

S. S. HITCHCOCK.
Platform-Balance.

No. 216,957. Patented July 1, 1879.

Witnesses:
J. P. Th. Lang.
C. A. Didden

Inventor:
Silvester S. Hitchcock
by
Maur. Renwick & Lawrence

UNITED STATES PATENT OFFICE.

SILVESTER S. HITCHCOCK, OF DES MOINES, IOWA.

IMPROVEMENT IN PLATFORM-BALANCES.

Specification forming part of Letters Patent No. 216,957, dated July 1, 1879; application filed May 15, 1879.

*To all whom it may concern:*

Be it known that I, SILVESTER S. HITCHCOCK, of Des Moines, in the county of Polk and State of Iowa, have invented a new and useful Improvement in Scales, which improvement is fully described in the following specification and drawings, in which latter—

Figure 1:
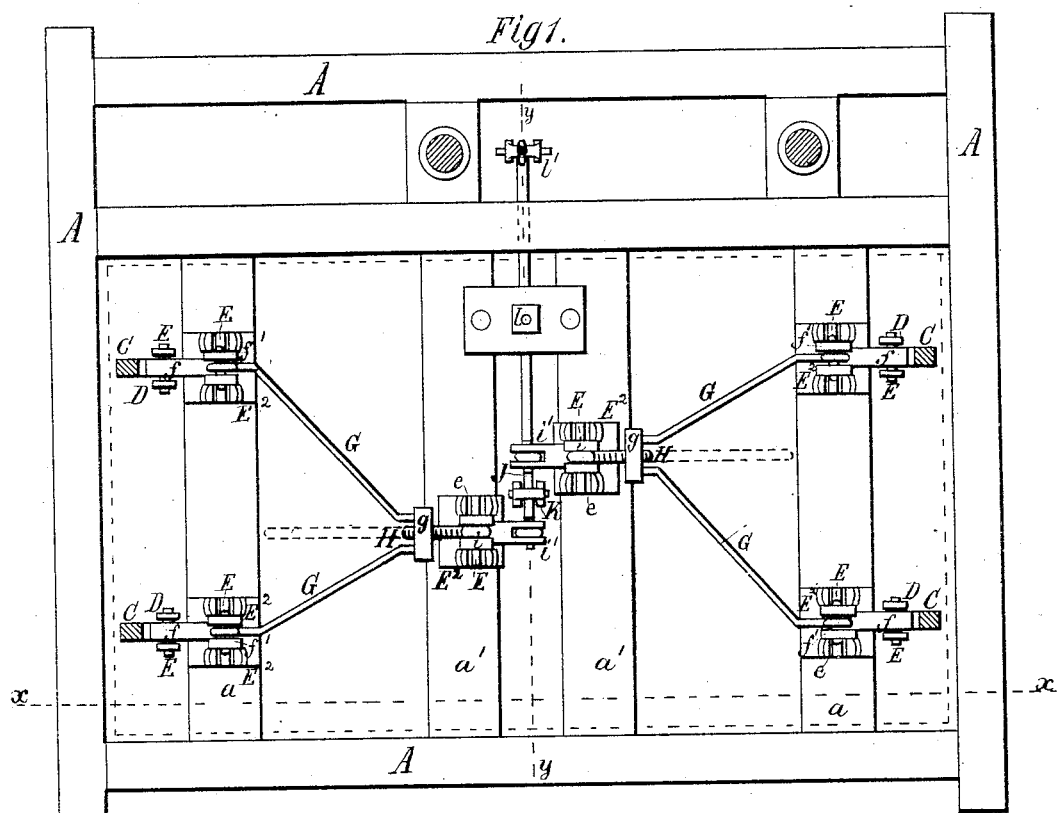
Figure 2:
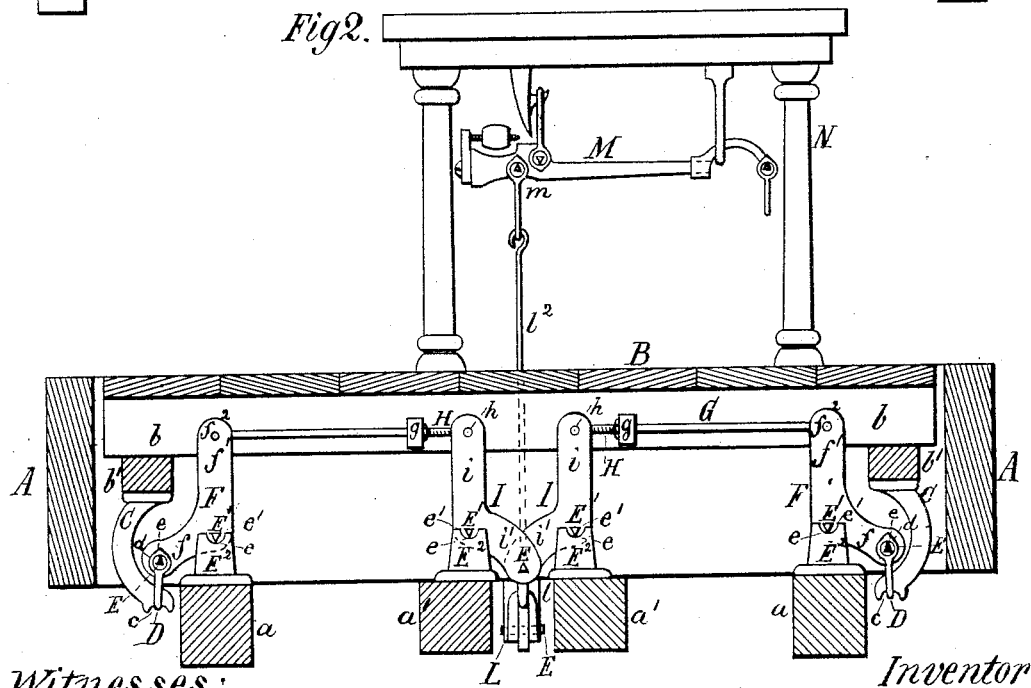
Figure 3:
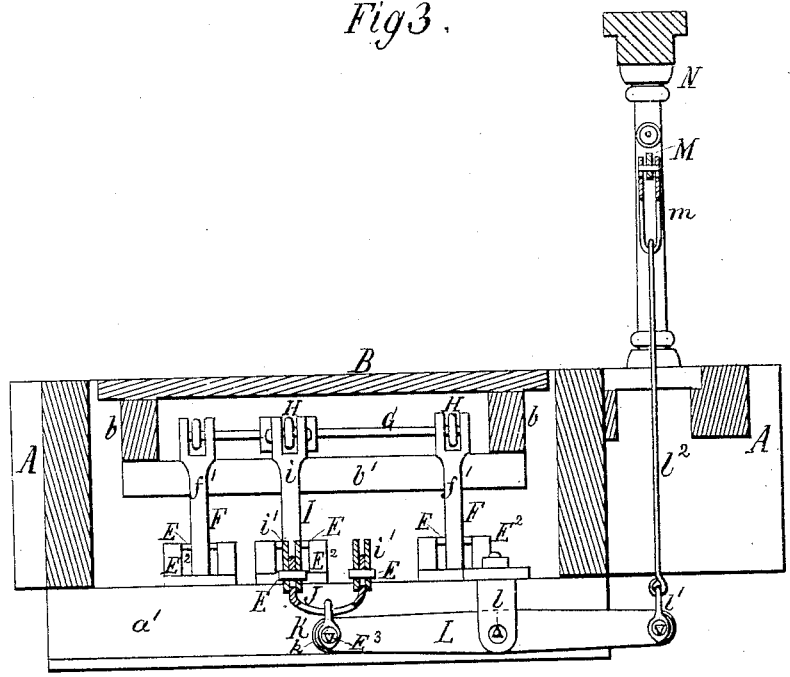
Figure 4:
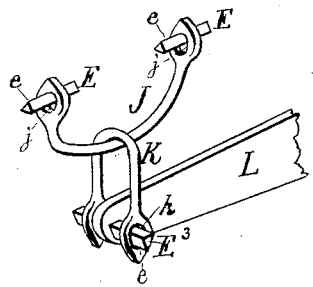

Figure 1 is a top view of my improved scale, showing the platform removed and the brackets or hangers thereof, by which it is connected with the weighing mechanism, in horizontal section. Fig. 2 is a vertical longitudinal section of the same in the line $x\ x$ of Fig. 1, the platform being in its position. Fig. 3 is a vertical central cross-section in the line $y\ y$ of Fig. 1, showing the connecting parts of the weighing mechanism; and Fig. 4 is an enlarged detail perspective view of the connection between the central parts of the weighing mechanism.

The nature of my invention consists in certain constructions, combinations, and arrangement of parts, as hereinafter fully described and specifically claimed, whereby a scale is produced simple in construction, reliable, and durable, and which can be adapted to either a long or a short platform with very little expense and change of the parts, and which can readily be taken apart or put together, and when stored away for shipping requires but little room.

In the annexed drawings, A represents a frame of ordinary construction, provided with interior cross-beams, $a$ and $a'$, the beams $a$ serving as foundation-supports. B represents the weighing-platform, held together by two longitudinal beams, $b$, and two cross-beams, $b'$.

To the cross-beams $b'$ four curved brackets or hangers, C, are attached. The lower ends of these brackets are hollowed out, and thus made to form bearings $c$, which rest upon stirrups D, provided with hollow cylindrical bearings $d$ at their upper ends. The bearings of these stirrups rest upon the knife-edges $e$ of transverse bearing-rods E, which are firmly inserted into the ends of the horizontal or nearly horizontal short arms $f$ of elbow or angular levers F. The levers F are provided with fulcrum-rods $E^1$, and the knife-edges $e$ of the rods $E^1$ rest in and upon semi-cylindrical bearings $e'$ of forked standards $E^2$, suitably fastened to the beams $a$, and arranged as near as practicable immediately under the four corners of the platform B.

The long arms $f^1$ of the elbow-levers F are nearly at a right angle with the short arms $f$ of said levers. The levers F are arranged in pairs on opposite sides of the center of the platform and have opposite movements, and each of the levers of the respective pairs is provided with a draft-rod, G, which is attached by one end to the arm $f^1$, by an ordinary pin, $f^2$. Two of these rods G are coupled near the center of the scale by short plates $g$ in a suitable manner, and a loop-screw, H, is screwed into the center of each plate $g$, and is connected by a pin, $h$, to the upper end of the vertical arm $i$ of an angular lever, I. By means of this loop-screw H the connection between the respective inner levers, I, and the respective pairs of outer levers, F, is adjusted in regard to length.

The levers I are shaped similar to the levers F, and have a long vertical arm, $i$, and a short arm, $i'$, and their fulcra have transverse rods $E^1$, with knife-edge bearings $e$, which rest in bearings $e'$ of forked standards $E^2$, suitably fastened to the beams $a'$. The swinging ends of the short arms $i'$ of the levers I are provided with transverse rods E, having knife-edge bearings $e$, upon which latter the eye-bearings $j$ in the ends of a stirrup, J, rest.

The stirrup J is suspended, and on its center part another stirrup, K, is suspended, as clearly shown in Fig. 4. The lower ends of the stirrups K are provided with eye-bearings $k$, in which the knife-edge bearing $e$ of a rod, $E^3$, rests. This rod $E^3$ is suitably fastened into the end of a lever, L, which has an ordinary knife-edge fulcrum at $l$, and a knife-edge and stirrup connection, $l^1$. The connection $l^1$ is, by means of a draft-rod, $l^2$, and connection $m$, similar to $l^1$, connected with an ordinary scale-beam, M, suitably hung to a support, N, of the frame A.

By making the arms $i$ and $f^1$ of the levers I F of equal length no reduction of leverage takes place between them, and the knife-edge connection may be safely substituted by an ordinary pin, $h$, as shown and described.

By connecting a stirrup, J, to both levers I, and a stirrup, K, to the stirrup J and lever L, a loose accommodating swinging connection is secured between the three levers I I L, which compensates for all the differences in the operation of the levers I which may arise from loading the platform B out of its center.

The construction of my weighing mechanism enables me to construct scales of the same weighing capacity with platforms and frames of different lengths without changing the main and more costly parts of the mechanism, this being accomplished by giving an additional length to the threaded portion of the loop-screws H, as indicated by dotted lines in Fig. 1, and by means of which elongation the whole weighing mechanism may be so extended as to suit platforms and frames of any desired length.

I claim—

1. In a platform weighing-scale, the combination of a platform, B, brackets or hangers C, stirrups D, elbow-levers F I, having knife-edge bearings, connections G H, loose accommodating swinging knife-edge connection J K, and lever L, substantially as and for the purpose set forth.

2. The combination of the levers I I and beam L, having knife-edge bearings, and the stirrups J K, connecting the upper levers, I I, with the lever L, substantially as and for the purpose set forth.

3. In a platform weighing-scale, the combination of the loop-screws H, plates $g$, rods G, converged toward one another and united in pairs by the said plates $g$, and elbow-levers I F, substantially as and for the purpose set forth.

Signed in presence of two subscribing witnesses.

SILVESTER S. HITCHCOCK.

Witnesses:
  WILLIAM A. YOUNG,
  J. E. TETTEY.